United States Patent
Achten et al.

(10) Patent No.: US 10,337,955 B2
(45) Date of Patent: Jul. 2, 2019

(54) METHOD FOR CHARACTERIZING MODE GROUP PROPERTIES OF MULTIMODAL LIGHT TRAVELING THROUGH OPTICAL COMPONENTS

(71) Applicant: Draka Comteq B.V., Amsterdam (NL)

(72) Inventors: Franciscus Johannes Achten, Tilburg (NL); Denis Molin, Draveil (FR); Pierre Sillard, Le Chesnay (FR); Marianne Bigot-Astruc, Janvry (FR)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 15/381,661

(22) Filed: Dec. 16, 2016

(65) Prior Publication Data

US 2017/0097282 A1 Apr. 6, 2017

Related U.S. Application Data

(63) Continuation-in-part of application No. PCT/IB2014/001347, filed on Jun. 17, 2014.

(51) Int. Cl.
*G01N 21/00* (2006.01)
*G02B 6/42* (2006.01)
(Continued)

(52) U.S. Cl.
CPC ............. *G01M 11/338* (2013.01); *G01J 9/00* (2013.01); *G02B 6/0288* (2013.01);
(Continued)

(58) Field of Classification Search
CPC .. G01J 2009/004; G01J 2009/006; G01J 9/00; G01M 11/338; G02B 6/0288; G02B 6/0365; G02B 6/14
(Continued)

(56) References Cited

U.S. PATENT DOCUMENTS 5,251,022 A 10/1993 Kitamura
6,788,397 B1 9/2004 Golowich et al.
(Continued)

FOREIGN PATENT DOCUMENTS

CN 101738688 A 6/2010
CN 102621627 A 8/2012
(Continued)

OTHER PUBLICATIONS

International Search Report in counterpart International Application No. PCT/IB2014/001347 dated Feb. 26, 2015, pp. 1-2.
(Continued)

*Primary Examiner* — Sunghee Y Gray
(74) *Attorney, Agent, or Firm* — Additon, Higgins & Pendleton, P.A.

(57) ABSTRACT

The invention concerns a method for characterizing mode group properties of multimodal light traveling through an optical component, comprising:
providing a Mode Group Separating optical fiber in an optical path between a light source and said optical component;
launching reference pulses of light with a wavelength λt from said light source through said Mode Group Separating optical fiber into said optical component at discrete intervals between a core center and a core radius of said fiber.

The Mode Group Separating optical fiber is a multimode fiber with an α-profile graded index core with an α-value chosen such that said fiber satisfies the following criterion at the wavelength λt:

$$\frac{|\Delta \tau| \cdot L}{\Delta T_{REF}} > 4$$

(Continued)

where:

$\Delta\tau$ is a time delay difference between consecutive mode groups;

L is a length of said fiber;

$\Delta T_{REF}$ is a Full Width at Quarter Maximum of said reference pulses.

12 Claims, 8 Drawing Sheets

(51) Int. Cl.

| | |
|---|---|
| *G01M 11/00* | (2006.01) |
| *G02B 6/028* | (2006.01) |
| *G02B 6/036* | (2006.01) |
| *G01J 9/00* | (2006.01) |
| *G02B 6/14* | (2006.01) |

(52) U.S. Cl.
CPC ............ *G02B 6/0365* (2013.01); *G02B 6/14* (2013.01); *G01J 2009/004* (2013.01); *G01J 2009/006* (2013.01)

(58) Field of Classification Search
USPC ............................................ 356/73.1; 385/28
See application file for complete search history.

(56) References Cited

U.S. PATENT DOCUMENTS

| | | | |
|---|---|---|---|
| 8,630,545 | B2 | 1/2014 | Gholami et al. |
| 8,958,675 | B2 | 2/2015 | Bickham et al. |
| 2012/0195549 | A1* | 8/2012 | Molin ................. G02B 6/0281 385/28 |
| 2012/0294576 | A1 | 11/2012 | Li |
| 2013/0071114 | A1 | 3/2013 | Bickham et al. |
| 2013/0071115 | A1 | 3/2013 | Bennett et al. |
| 2013/0100437 | A1 | 4/2013 | Molin et al. |
| 2014/0079392 | A1 | 3/2014 | Essiambre et al. |

FOREIGN PATENT DOCUMENTS

| | | |
|---|---|---|
| CN | 103067084 A | 4/2013 |
| EP | 2579483 A1 | 4/2013 |
| EP | 2584388 A1 | 4/2013 |
| WO | 2014/011525 A2 | 1/2014 |
| WO | 2015/193694 A1 | 12/2015 |

OTHER PUBLICATIONS

Freund et al., "High-Speed Transmission in Multimode Fibers", Journal of Lightwave Technology, vol. 28, No. 4, Feb. 15, 2010, pp. 1-18.

International Preliminary Report on Patentability in counterpart International Application No. PCT/IB2014/001347 dated Dec. 20, 2016, pp. 1-6.

* cited by examiner

METHOD FOR CHARACTERIZING MODE GROUP PROPERTIES OF MULTIMODAL LIGHT TRAVELING THROUGH OPTICAL COMPONENTS

1. CROSS-REFERENCE TO PRIORITY APPLICATION

This application is a continuation-in-part of International Application No. PCT/IB2014/001347 for a Method for Characterizing Mode Group Properties of Multimodal Light Traveling through Optical Components (filed Jun. 17, 2014, and published Dec. 23, 2015, as Publication No. WO 2015/193694 A1), each of which is hereby incorporated by reference in its entirety.

2. FIELD OF THE INVENTION

The invention relates to the field of optical fiber transmissions, and more specifically to a method for characterizing Mode Group properties of multimodal light traveling through optical components, used for such optical fiber transmissions.

3. BACKGROUND

Multimode fibers are successfully used in high-speed data networks. However, they are affected by intermodal dispersion, which results from the fact that, for a particular wavelength, several optical modes propagate simultaneously along the fiber, carrying the same information, but travelling with different propagation velocities. Modal dispersion is expressed in terms of Differential Mode Delay (DMD), which is a measure of the difference in pulse delay (ps/m) between the fastest and slowest modes traversing the fiber.

In order to minimize modal dispersion, the multimode optical fibers used in data communications generally comprise a core showing a refractive index that decreases progressively going from the center of the fiber to its junction with a cladding. In general, the index profile is given by a relationship known as the "α-profile," as follows:

$$n(r) = n_0 \sqrt{1 - 2\Delta\left(\frac{r}{a}\right)^\alpha} \quad \text{for } r \leq a,$$

where:
$n_0$ is a refractive index on an optical axis of a fiber;
r is a distance from said optical axis;
a is a radius of the core of said fiber;
$\Delta$ is a non-dimensional parameter, indicative of an index difference between the core and a cladding of the fiber; and
$\alpha$ is a non-dimensional parameter, indicative of a shape of the index profile.

When a light signal propagates in such a core having a graded index, the different modes experience a different propagation medium, which affects their speed of propagation differently. By adjusting the value of the parameter α, it is thus possible to theoretically obtain a group velocity, which is virtually equal for all the modes and thus a reduced intermodal dispersion for a particular wavelength. However, an optimum value of the parameter α is valid for a particular wavelength only. Furthermore, the exact parameter value α, as well as the actual shape of the refractive index profile, are difficult to control during manufacture of the fiber.

As a consequence, intermodal dispersion cannot be completely dismissed nor neglected.

In such graded-index multimode fibers, groups of modes with substantially identical propagation constants exist. Hence, the optical modes traveling along the fiber are sorted into mode groups, which are defined such that modes of the same mode group exhibit nearly the same group index. Group index difference between neighboring mode groups, and thus time of flight difference, are nearly the same for all mode groups.

The propagation of Mode Groups through optical components, such as optical fibers, has been subject to investigations for a long time.

High speed multimode optical fibers such as OM4 fibers (which are laser-optimized, high bandwidth 50 μm multimode fibers, standardized by the International Standardization Organization in document ISO/IEC 11801, as well as in TIA/EIA 492AAAD standard, each of which is hereby incorporated by reference in its entirety) reach maximum speed if all Mode Groups experience the same 'time of flight' while passing through the fiber. The design of such fibers depends strongly on DMD (Differential Mode Delay) measurements at the operational wavelength (850 nm).

If the different Mode Groups do not experience the same time of flight, the 'DMD profile' broadens, and the related optical bandwidth decreases. This means in practice the maximum number of bits per second, which may be transmitted by the optical fiber, is limited to a value determined by the measured bandwidth value. If the DMD profile is slightly wider than the ideal profile (which corresponds to a profile in which all pulses leaving the fiber experience the same time of flight, and show the same shape as the laser pulses launched into the fiber), some Mode Groups are not transmitted ideally by the fiber, and cause a decrease in bandwidth.

In today's state of the art, it is however not possible to know exactly which Mode Groups cause the broadening of the DMD profile.

The same fact may be acknowledged for other optical components like fiber-to-fiber couplers, attenuators and detectors. Although their overall performance and characteristics may be assessed, it is not possible to know how Mode Groups behave while passing through such optical components, nor how they may play a role on their performance.

Patent document U.S. Pat. No. 5,251,022, which is hereby incorporated by reference in its entirety, describes a measurement system, which quickly and nondestructively characterizes the mode-dependent losses and coupling of a multi-mode, graded-index, connectorized, passive fiber optic component.

Such a measurement system allows determining the mode transition matrix of the optical component under test and comprises:
- mode selective launcher means having a plurality of optical paths with varying launch conditions;
- input-output optic means having at least one reference optical path and at least one optical path for the passive fiber optic component under test;
- mode selective detection means having a plurality of optical paths with a variety of mode filters, and
- means for data storage and matrix calculation.

The mode transition matrix, as well as the modal power vector, is calculated using measurements of the optical power propagated through optical courses comprising the optical paths. In other words, the system uses mode filters and fiber optic switches to create optical paths, with the measurement of power propagating through each optical path being used to determine the mode transition matrix of the passive fiber optic component.

Such a measurement system is hence quite complex and cumbersome. Actually, it requires a serial combination of a mode selective launcher, an input/output section, and a mode selective detection section, each section containing a pair of optical switches.

Patent document EP 2 579 483, which is hereby incorporated by reference in its entirety, provides a method and a related apparatus for transmitting optical signals over a multi-mode fiber using spatial multiplexing. Optical signals are multiplexed into different principle mode groups of a graded-index multi-mode fiber. After transmitting the space division multiplexed optical signal over the multi-mode fiber, an optical Fourier transformation is performed, for instance by a lens, to spatially separate the multiplexed optical signals from the space division multiplexed optical signal, as rings with different radii. In other words, at the receiver, different principle mode groups are separated through an optical Fourier transformation.

Hence, patent document EP 2 579 483 provides a method for spatial mode groups separation through optical Fourier transformation. However, it does not allow assessing the individual behavior of mode groups while passing through an optical component.

It would hence be desirable to provide a simple method for characterizing Mode Group properties of multimodal light traveling through optical components, which would give experimental knowledge of how mode groups behave while passing through such optical components, like for instance optical fibers.

Such an experimental knowledge would serve design improvement of optical fibers and would allow, among others, achieving the best possible design for the highest quality of multimode fibers. It would hence allow increasing bit rates in multimodal optical systems.

4. SUMMARY

In one particular embodiment of the invention, a method for characterizing mode group properties of multimodal light traveling through an optical component is provided, which comprises the steps of:
providing a Mode Group Separating optical fiber in an optical path between a light source and said optical component;
launching reference pulses of light with a wavelength $\lambda t$ from said light source through said Mode Group Separating optical fiber into said optical component at discrete intervals between a core center and a core radius of said Mode Group Separating optical fiber.

Such a Mode Group Separating optical fiber is a multimode fiber with an $\alpha$-profile graded index core with an $\alpha$-value chosen such that said Mode Group Separating optical fiber satisfies the following criterion at the wavelength $\lambda t$:

$$\frac{|\Delta\tau| \cdot L}{\Delta T_{REF}} > 4$$

where:
$\Delta\tau$ is a time delay difference between consecutive mode groups expressed in ps/m;
L is a length of said Mode Group Separating optical fiber expressed in m;
$\Delta T_{REF}$ is a Full Width at Quarter Maximum of said reference pulses expressed in ps, where the Full Width at Quarter Maximum of a reference pulse is the difference between the two time values at which the power of the reference pulse is equal to quarter of its maximum value.

The invention thus relies on a novel and inventive approach for characterizing Mode Group properties of multimodal light traveling through optical components. Actually, the invention makes an innovative use of a specific type of multimode optical fiber, which permits to temporally separate different Mode Groups travelling through this specific fiber, and hence through the optical component provided at the output of such a specific MGS fiber. It is hence possible to study the individual behavior of each Mode Group traveling through the optical component, and thus assess its impact on the performance of the optical component.

According to an aspect of the invention, such a method comprises:
measuring a Dispersion Modal delay profile for said Mode Group Separating optical fiber, called a reference DMD profile;
measuring a Dispersion Modal delay profile at the output of said optical component, called a resulting DMD profile;
comparing said reference DMD profile and said resulting DMD profile, in order to characterize the mode group properties of multimodal light traveling through said optical component.

Depending on the type of optical component under test, other types of measurements and analysis may be achieved, in order to individually assess the behavior of each Mode Group. Such measurements and analysis are made possible thanks to the use of the MGS optical fiber, which allows temporally separating each Mode Group.

According to an aspect of the invention, said Mode Group Separating optical fiber satisfies the following criterion at the wavelength $\lambda t$:

$$\frac{|\Delta\tau| \cdot L}{\Delta T_{REF}} > 5$$

According to another aspect of the invention, said wavelength $\lambda t$ is comprised between 800 nm and 1500 nm. Depending on the value of the wavelength $\lambda t$ for which the optical component must be tested, a specific MGS optical fiber is chosen, among the MGS optical fibers fulfilling the criterion set above.

According to yet another aspect, said Mode Group Separating optical fiber has a core diameter of 50 µm±2.5 µm and a numerical aperture NA=0.2±0.015, and wherein:

$\Delta\tau(\lambda,\alpha)=p00+p10*\lambda+p01*\alpha+p11*\lambda*\alpha+p02*\alpha^2$ with:
p00 preferably comprised between −1.461 and −1.116, and more specifically
p00=−1.288,
p10 preferably comprised between −0.001516 and −0.00128,
and more specifically p10=−0.001398,
p01 preferably comprised between 1.061 and 1.317, and more specifically p01=1.189,
p11 preferably comprised between 0.0006583 and 0.0007706,
and more specifically p11=0.0007145, p02 preferably comprised between −0.3125 and −0.2581, and more specifically p02=−0.2853.

According to another embodiment of the invention, said Mode Group Separating optical fiber is a Few Mode optical fiber comprising an optical core having a radius $R_1$ and a maximal refractive index $n_0$ and an optical cladding surrounding the optical core, said optical cladding having at its outer edge a refractive index $n_{Cl}$, wherein said optical cladding comprises an inner cladding layer directly surrounding said optical core, with an inner radius $R_1$ and an outer radius $R_2 \geq R_1$, said inner cladding layer having a constant refractive index $n_2 = n_{Cl}$, and a region of depressed refractive index $n_{trench}$, called a trench, surrounding said inner cladding layer, said trench having an inner radius $R_2$, with $R_2 \geq R_1$, and an outer radius $R_3$, with $R_3 > R_2$.

Preferentially:

$R_1 = 14 \ \mu m \pm 0.5 \ \mu m$ $\Delta_1 = \frac{(n_0^2 - n_{Cl}^2)}{2n_0^2} = 0.705\% \pm 0.04\%$ $R_2 = 15.3 \ \mu m \pm 0.5 \ \mu m$ $R_3 = 21.4 \ \mu m \pm 0.5 \ \mu m$ $\Delta n_3 = n_{trench} - n_{Cl} = -5 \times 10^{-3} \pm 0.5 \times 10^{-3}$ and:

$\Delta \tau (\lambda, \alpha) = p00 + p10 * \lambda + p01 * \alpha + p11 * \lambda * \alpha + p02 * \alpha^2$ with:
p00 preferably comprised between −1.947 and −1.604, and more specifically p00=−1.776,
p10 preferably comprised between −0.001977 and −0.001743, and more specifically p10=−0.00186,
p01 preferably comprised between 1.389 and 1.644, and more specifically p01=1.517,
p11 preferably comprised between 0.0009262 and 0.001038, and more specifically p11=0.000982,
p02 preferably comprised between −0.3776 and −0.3235, and more specifically 02=−0.3505.

Using a Few Mode Fiber as a MGS optical fiber allows characterizing the behavior of the Mode Groups travelling through some specific optical components, such as Few Mode Fibers themselves.

According to yet another aspect of the invention, L=550 m and $\Delta T_{REF}$=40 ps.

According to yet another aspect, said optical component belongs to the group comprising:
a Variable Optical Attenuator (VOA);
an optical fiber;
a coupler;
a detector.

According to yet another aspect, such a method also comprises collecting light output by said optical component into a second Mode Group Separating optical fiber, where said second Mode Group Separating optical fiber is a multimode fiber with an α-profile graded index core with an α-value chosen such that said Mode Group Separating optical fiber satisfies the following criterion at the wavelength λt:

$$\frac{|\Delta \tau| \cdot L}{\Delta T_{REF}} > 4$$

where:
$\Delta \tau$ is a time delay difference between consecutive mode groups expressed in ps/m;
L is a length of said Mode Group Separating optical fiber expressed in m;
$\Delta T_{REF}$ is a Full Width Quarter Maximum of said reference pulses expressed in ps.

It is hence possible to use two MGS optical fibers respectively disposed before and after the optical component under test on the optical path. On top of assessing the behavior of mode groups launched into the optical component through the first MGS optical fiber, it also allows studying the modes coupling phenomenon within the optical component. Both MGS optical fibers may be identical or show different features, as long as they both fulfill the above criterion.

The present invention also provides a system for characterizing mode group properties of multimodal light traveling through an optical component, wherein said system comprises:
a light source emitting reference pulses of light with a wavelength λt;
a Mode Group Separating optical fiber in an optical path between said light source and said optical component;
a launch fiber launching said reference pulses of light to an input side of said Mode Group Separating optical fiber;
means for changing said launch fiber's position in discrete steps, between a position in which said launch fiber is aligned with a core center of said Mode Group Separating optical fiber and a position in which said launch fiber is aligned with a core radius of said Mode Group Separating optical fiber;
a detector for detecting light signal output by said optical component;
and wherein said Mode Group Separating optical fiber is a multimode fiber with an α-profile graded index core with an α-value chosen such that said Mode Group Separating optical fiber satisfies the following criterion at the wavelength λt:

$$\frac{|\Delta \tau| \cdot L}{\Delta T_{REF}} > 4$$

where:
$\Delta \tau$ is a time delay difference between consecutive mode groups expressed in ps/m;
L is a length of said Mode Group Separating optical fiber expressed in m;
$\Delta T_{REF}$ is a Full Width Quarter Maximum of said reference pulses expressed in ps.

According to another embodiment of the invention, a method for characterizing mode group properties of multimodal light traveling through an optical component is provided, which comprises the steps of:
launching a reference pulse of light with a wavelength λt from a light source into said optical component,
collecting light signal output by said optical component into a Mode Group Separating optical fiber.

Such a Mode Group Separating optical fiber is a multimode fiber with an α-profile graded index core with an α-value chosen such that said Mode Group Separating optical fiber satisfies the following criterion at the wavelength λt:

$$\frac{|\Delta\tau|\cdot L}{\Delta T_{REF}} > 4$$

where:
- $\Delta\tau$ is a time delay difference between consecutive mode groups expressed in ps/m;
- $L$ is a length of said Mode Group Separating optical fiber expressed in m;
- $\Delta T_{REF}$ is a Full Width Quarter Maximum of said reference pulse expressed in ps.

As compared to the first embodiment described above, the respective positions of the MGS optical fiber and the optical component under test have been changed in this second embodiment. Such a method enables Mode Power Distributions measurement from a given pulse launching condition to the optical component under test. The MGS optical fiber thus serves as a tool for separating the Mode Groups induced by the light source in the optical component under test.

The invention also provides a system for characterizing mode group properties of multimodal light traveling through an optical component, which comprises:
- a light source emitting a reference pulse of light with a wavelength $\lambda t$;
- launching means for launching said reference pulse of light into said optical component;
- a Mode Group Separating optical fiber collecting light signal output by said optical component;
- a detector for detecting light signal output by said Mode Group Separating optical fiber.

Such a Mode Group Separating optical fiber is a multimode fiber with an $\alpha$-profile graded index core with an $\alpha$-value chosen such that said Mode Group Separating optical fiber satisfies the following criterion at the wavelength $\lambda t$:

$$\frac{|\Delta\tau|\cdot L}{\Delta T_{REF}} > 4$$

where:
- $\Delta\tau$ is a time delay difference between consecutive mode groups expressed in ps/m;
- $L$ is a length of said Mode Group Separating optical fiber expressed in m;
- $\Delta T_{REF}$ is a Full Width Quarter Maximum of said reference pulse expressed in ps.

5. BRIEF DESCRIPTION OF THE DRAWINGS

The invention can be better understood with reference to the following description and drawings, given by way of example and not limiting the scope of protection, and in which:

FIGS. 1 to 6 describe the features of a Mode Group Separating optical fiber according to embodiments of the invention, among which:

FIG. 1 illustrates the parameters $\Delta\tau$ and $\Delta T_{REF}$ used in the criterion $$\frac{|\Delta\tau|\cdot L}{\Delta T_{REF}} > X$$

for a multimode optical fiber according to an embodiment of the invention, for two consecutive mode groups with normalized pulse power;

Figure 2:
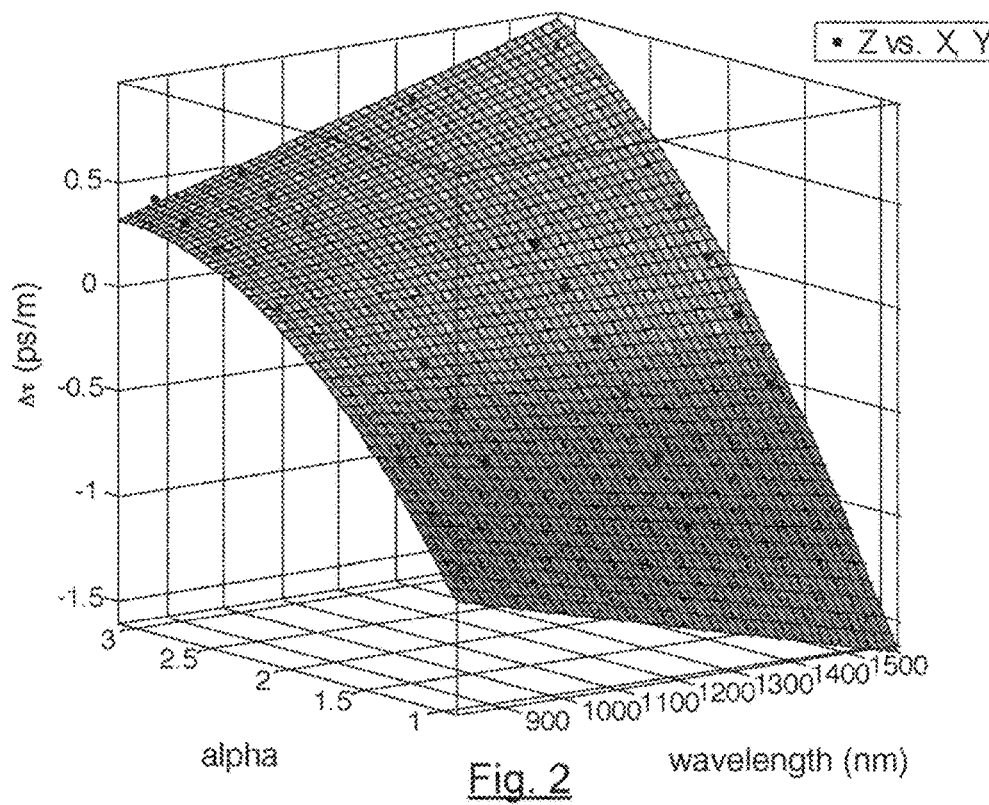
FIG. 2 shows an approximation of the $\Delta\tau$ time-delay difference as a function of the wavelength $\lambda t$ and of the $\alpha$ parameter.
Figure 3:
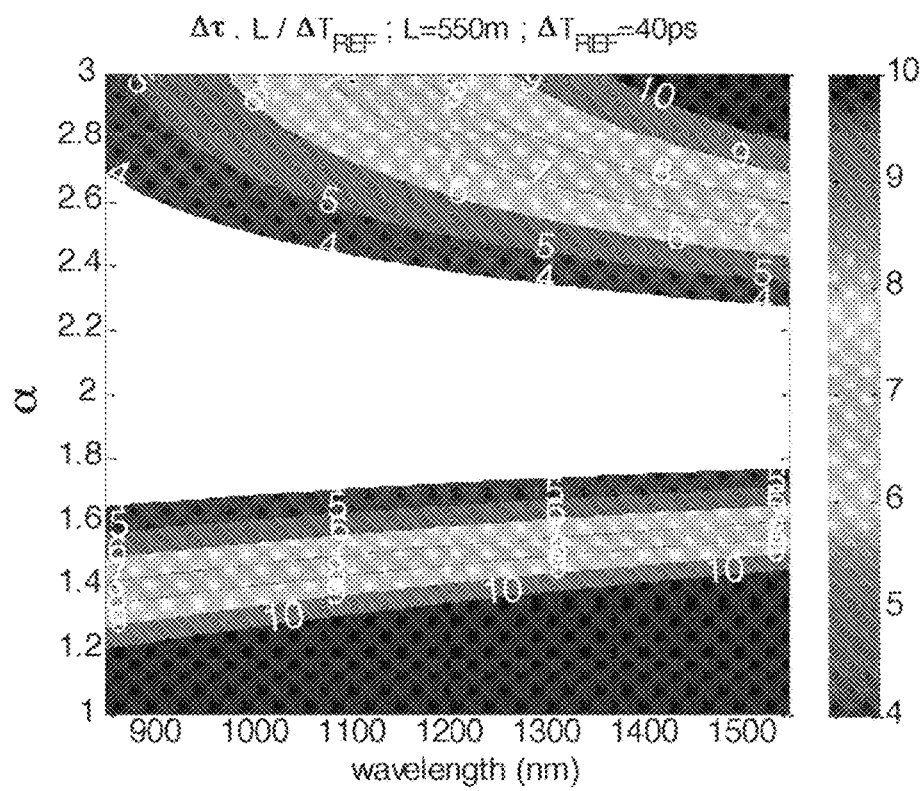
FIG. 3 shows an abacus of the criterion $$\frac{|\Delta\tau|\cdot L}{\Delta T_{REF}} > X$$
Figure 4:
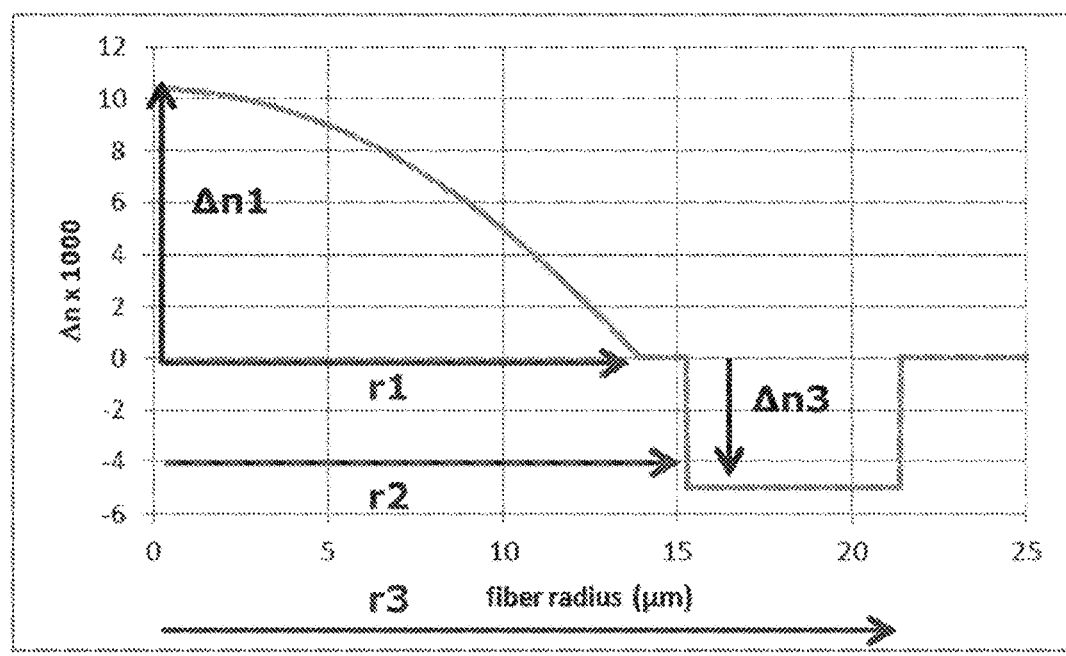
Figure 5:
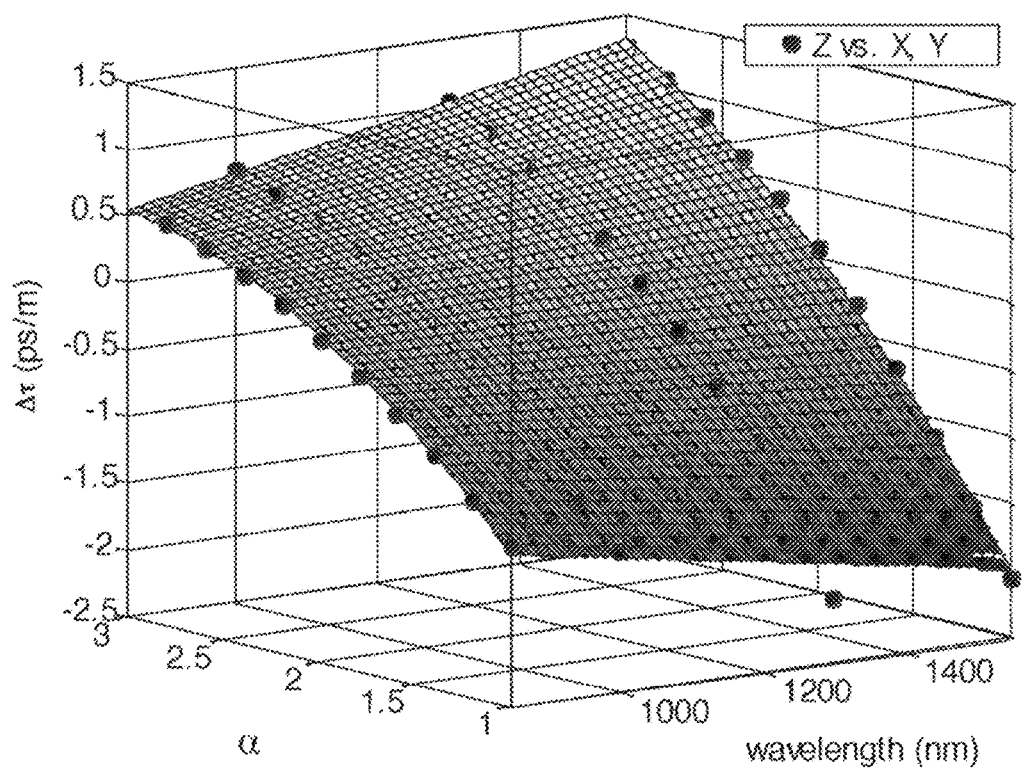
Figure 6:
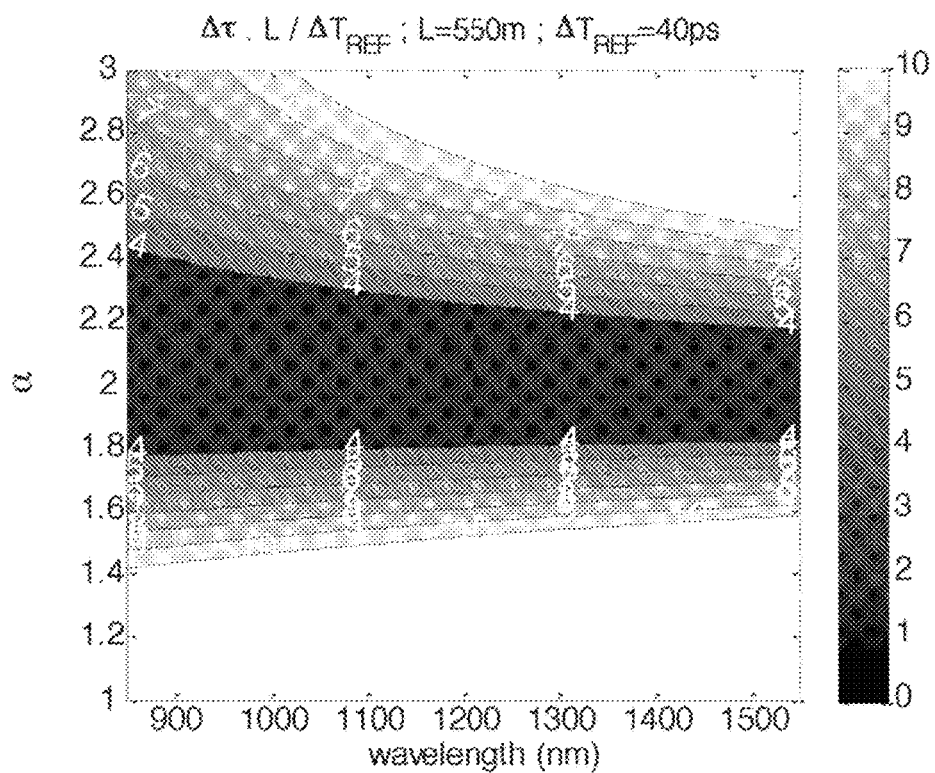

for a multimode optical fiber according to an embodiment of the invention with a length L=550 m and a FWQM of the reference pulse $\Delta T_{REF}$=40 ps;

FIG. 4 depicts the refractive index profile of a Few Mode Fiber according to an embodiment of the invention;

FIG. 5 shows the approximation of FIG. 2 for the FMF of FIG. 4;

FIG. 6 shows the abacus of FIG. 3 for the FMF of FIG. 4.

Figure 7:
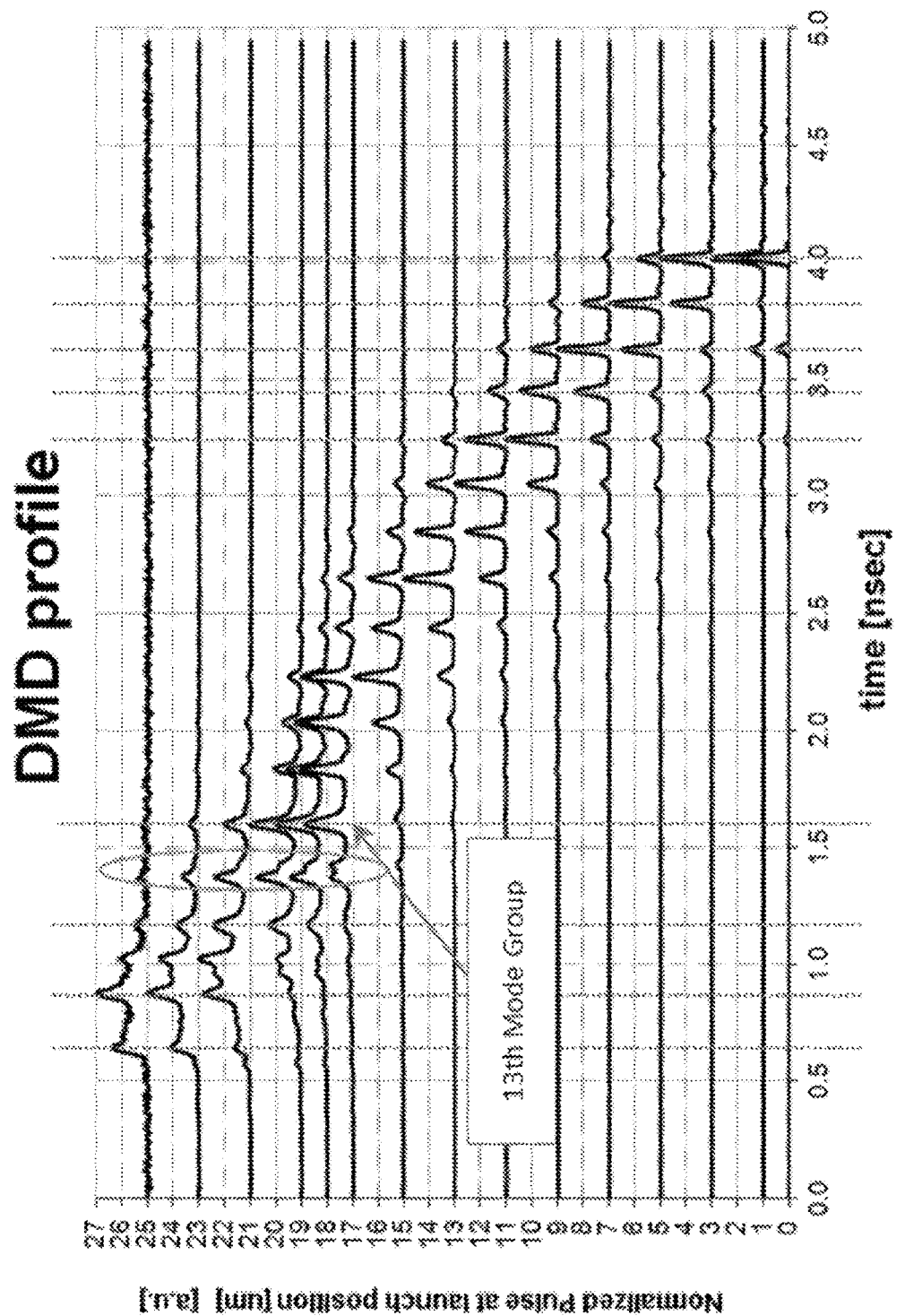
Figure 8:
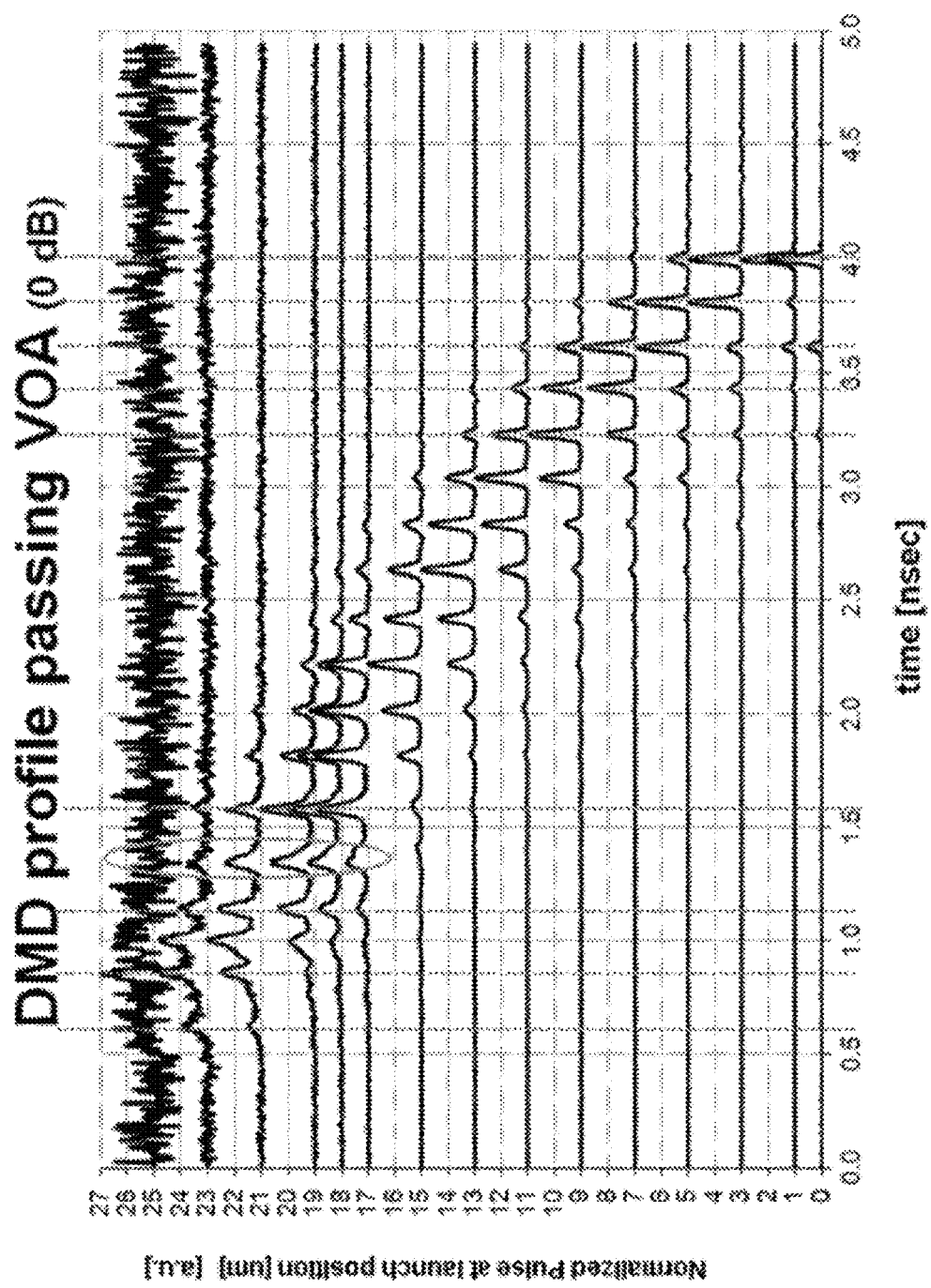
Figure 9:
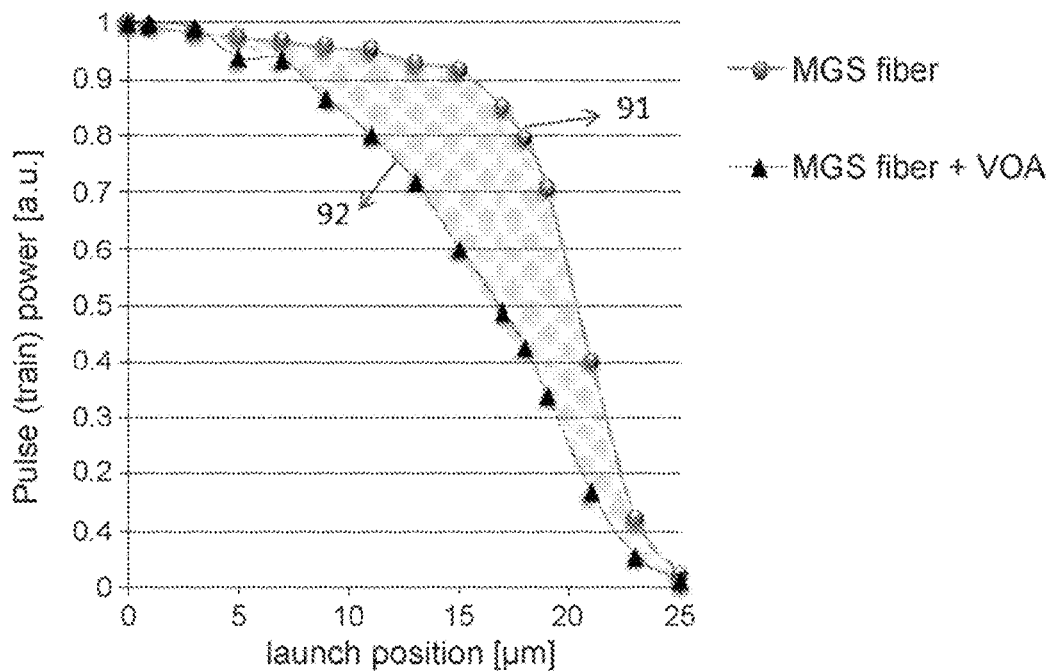
Figure 10:
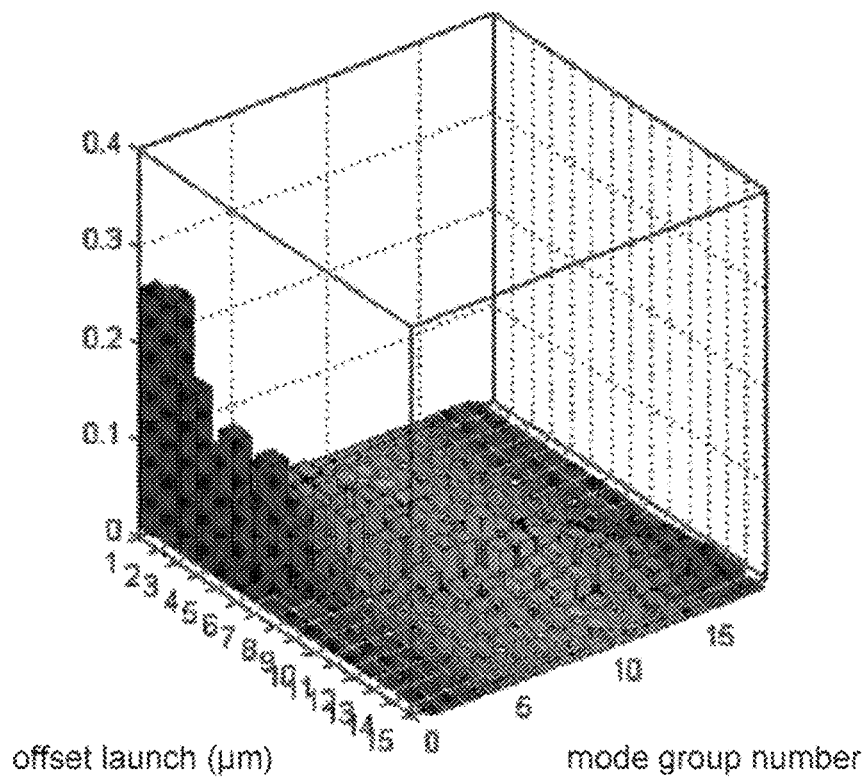
Figure 11:
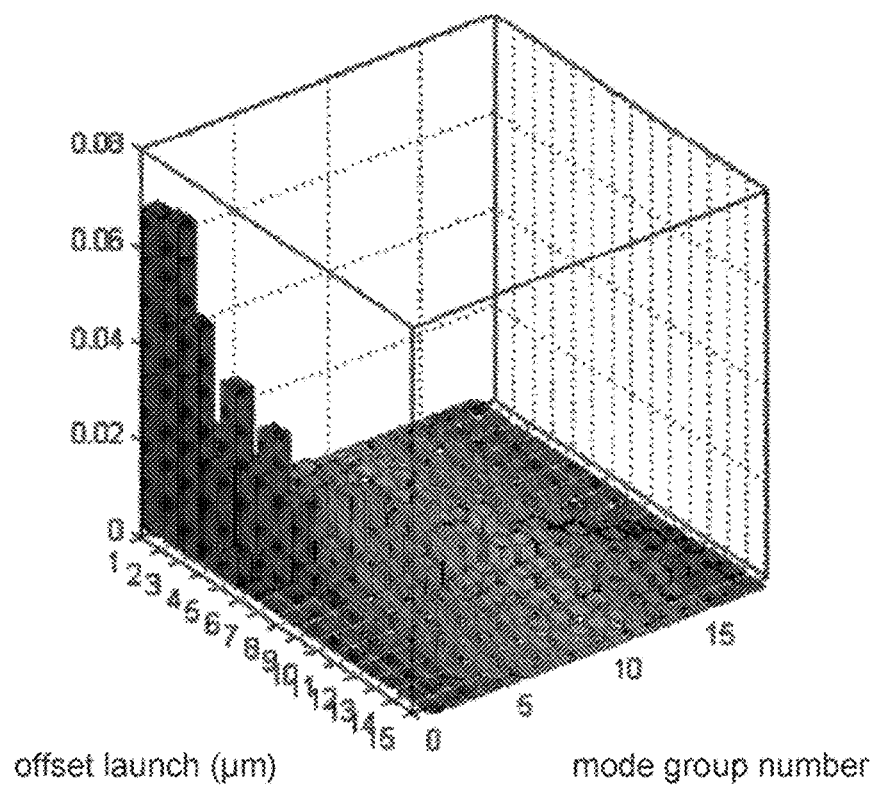
Figure 12:
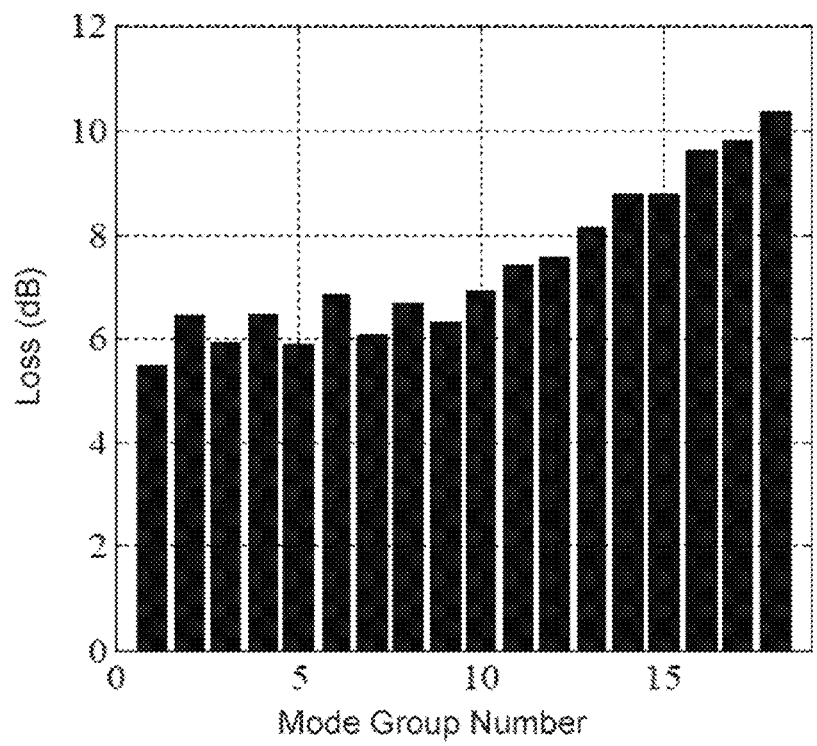
Figure 13:
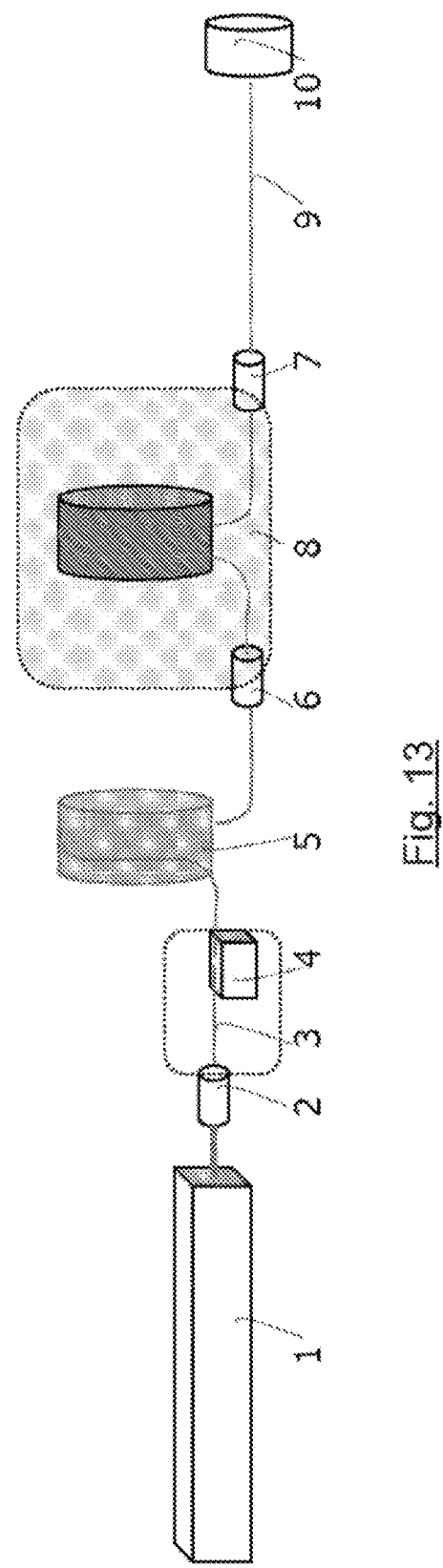

FIGS. 7 to 13 describe several features of an embodiment of the method and system according to the invention using a specific Mode Group Separating optical fiber according to FIGS. 1 to 6, among which:

FIG. 7 shows the DMD profile of a MGS optical fiber according to an embodiment of the invention;

FIG. 8 shows the DMD profile measured thanks to the system of FIG. 13;

FIG. 9 shows the power of the pulses (pulse trains) as a function of the launch position expressed in lam plotted for both DMD measurements of FIGS. 7 and 8;

FIG. 10 shows the Mode Power Distributions of the light entering the VOA of FIG. 13;

FIG. 11 shows the Mode Power Distributions of the light leaving the VOA of FIG. 13;

FIG. 12 shows the loss per Mode Group Number inside the VOA of FIG. 13;

FIG. 13 shows an embodiment of a system used for characterizing the behavior of Mode Groups traveling through an optical component, such as a Variable Optical Attenuator.

The components in the figures are not necessarily to scale, emphasis instead being placed upon illustrating the principles of the invention.

6. DETAILED DESCRIPTION

The general principle of the invention relies on the use of a specifically designed Mode Group Separating optical fiber, which is inserted on the optical path between a light source and an optical component under test, and which has the ability to separate the Mode Groups in time domain before or after these are launched into the optical component under test. As a consequence, the behavior of these Mode Groups while passing through the optical component may be studied individually from each other.

Embodiments of the invention thus provide a simple and valuable method for characterizing Mode Groups properties of multimodal light traveling through optical components. The experimental results thus achieved may be used for improving the design of multimode and few-mode optical fibers, as well as the design of optical components.

FIGS. 1 to 6 describe the features of a Mode Group Separating optical fiber according to embodiments of the invention.

As stated previously in this document, in an optical fiber, a certain number of modes can propagate. The lowest-order LP mode is $LP_{01}$, also called the fundamental mode. Each mode is associated with a particular propagation constant. In typical multimode fibers, these modes can be grouped together in sets of modes with the same or very similar propagation constant, the principal mode groups. The modes within a certain principal mode group have very similar properties. Therefore, modes are often treated in terms of mode groups instead of individual modes. The number of modes increases with mode group number m: while the lowest-order mode groups only consist of one mode, the higher-order mode groups will contain several modes. In principal modes groups with modes of identical propagation constants, the mode delay will be generally the same for each mode. This is the reason why they are often treated as one mode group with a single mode delay for all modes.

The difference of time of flight between consecutive mode groups is, at first order, function of the α-value, the numerical aperture (or delta of the core), the core diameter and the wavelength of operation. At second order, this difference of time of flight between consecutive mode groups is function of the dopant content within the fiber core (depending on whether the core is fully doped with Germanium, fully doped with fluorine or whether it exhibits a germanium and fluorine co-doping).

According to an embodiment of the invention, these parameters are adapted so that the mode group can be separated in time at DMD measurements. This condition can be expressed as follows:

$$\frac{|\Delta\tau| \cdot L}{\Delta T_{REF}} > X$$

where $\Delta\tau$ is the time delays difference between consecutive mode groups in ps/m, L is the minimum fiber length to be used in the DMD measurements, expressed in m, $\Delta T_{REF}$ is the FWQM (Full Width Quarter Maximum) of the reference pulse used in the DMD measurements, expressed in ps, and X is a threshold that is greater than 4 and more preferably larger than 5.

Throughout this document, the terms "DMD measurements" designate measurements of the delay due to the modal dispersion, known under the acronym DMD for "Dispersion Modal Delay" graphical representation. The DMD measurement procedure has been the subject of standardization (IEC 60793-1-49 and FOTP-220, each of which is hereby incorporated by reference in its entirety) and is also specified in Telecommunications Industry Association Document no. TIA-455-220-A, which is hereby incorporated by reference in its entirety. The DMD metric is expressed in units of picoseconds per meter (ps/m) so that the total delay is normalized by fiber length.

A DMD graphical representation is obtained by injecting a light pulse having a given wavelength $\lambda_0$ at the center of the fiber and by measuring the pulse delay after a given fiber length L; the introduction of the light pulse of given wavelength $\lambda_0$ being radially offset to cover the entire core of the multimode fiber.

Figure 1:
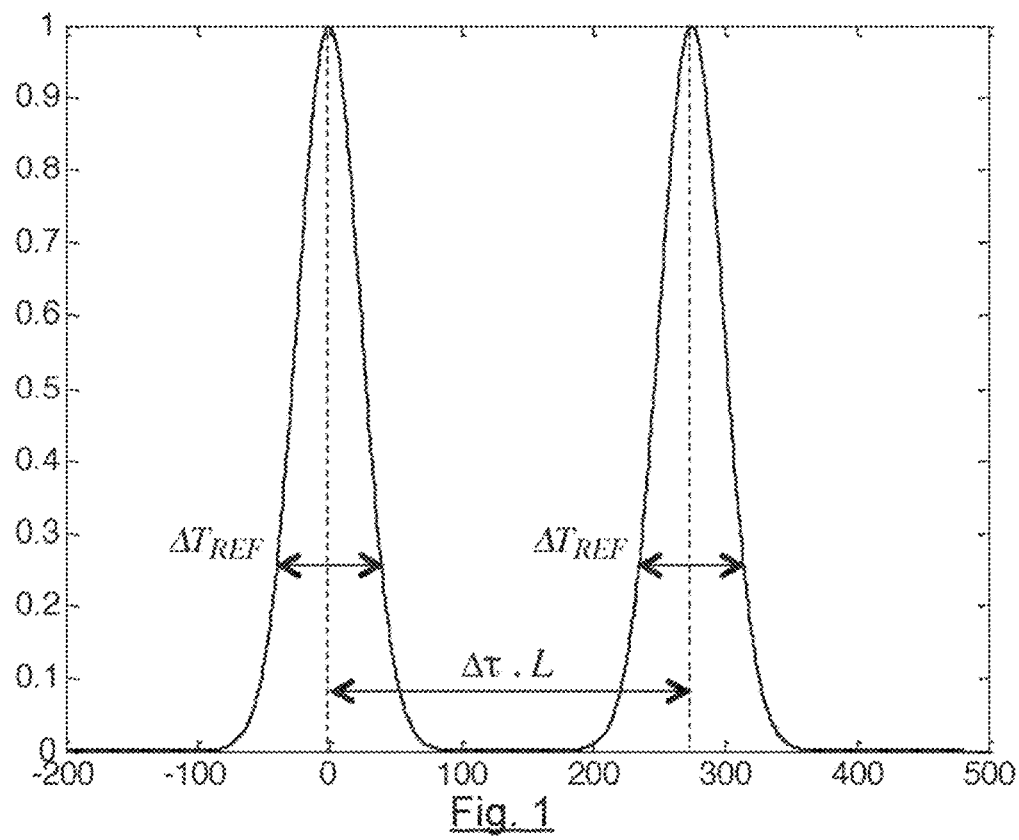

FIG. 1 illustrates the parameters $\Delta\tau$ and $\Delta T_{REF}$ used in the criterion $$\frac{|\Delta\tau| \cdot L}{\Delta T_{REF}} > X$$

for a multimode optical fiber according to the invention, for two consecutive mode groups with normalized pulse power. On FIG. 1, the X-axis corresponds to the time, expressed in ps, and the Y-axis corresponds to the normalized power.

By solving the scalar wave equation (as described in "High-Speed Transmission in Multimode Fibers", by Ronald E. Freund et al., Journal of Lightwave Technology, Vol. 28, No. 4, Feb. 15, 2010, which is hereby incorporated by reference in its entirety) through numerical simulation, one can approximate $\Delta\tau$ as follows, for a 50 μm MMF with a numerical aperture NA=0.200:

$$\Delta\tau(\lambda,\alpha) = p00 + p10*\lambda + p01*\alpha + p11*\lambda*\alpha + p02*\alpha^2$$

with:
  p00=−1.288 (−1.461, −1.116)
  p10=−0.001398 (−0.001516, −0.00128)
  p01=1.189 (1.061, 1.317)
  p11=0.0007145 (0.0006583, 0.0007706)
  p02=−0.2853 (−0.3125, −0.2581),
and where the values between brackets ( ) correspond to the 95% confidence bounds.

Such an approximation may be graphically displayed as shown on FIG. 2, where the X-axis corresponds to the wavelength λ expressed in nanometers, the Y-axis corresponds to the α-value of the MMF fiber, and the Z-axis corresponds to the time delays difference between consecutive mode groups in ps/m. Each black dot on FIG. 2 corresponds to a value calculated from the above model equation for $\Delta\tau(\lambda, \alpha)$, while the gray-shaded surface corresponds to the surface which may be approximated on the basis of the computed dots.

Making the assumption that the length of MGS optical fiber used is L=550 m, with a FWQM of the reference pulse $\Delta T_{REF}$=40 ps, one may derive the abacus displayed on FIG. 3, where the X-axis corresponds to the wavelength λ expressed in nanometers, and where the Y-axis corresponds to the α-value of the MMF fiber. The different curves drawn on the abacus of FIG. 3 correspond to the first part $$\frac{|\Delta\tau| \cdot L}{\Delta T_{REF}}$$

of the criterion described above. The number set on each curve indicates the value of $$\frac{|\Delta\tau| \cdot L}{\Delta T_{REF}},$$

ranging from 4 to 10.

As may be observed on FIG. 3, the blank zone corresponding to α values roughly comprised between 1.7 and 2.3 is a forbidden zone, in which the criterion set above cannot be fulfilled by the multimode optical fiber. Such a criterion may either by satisfied by choosing α values below 1.6 or above 2.7 at a wavelength λ=850 nm or above 2.3 at a wavelength λ=1500 nm.

According to other embodiments of the invention, the Mode Group Separating optical fiber may also be a Few Mode Fiber, also known as FMF.

FIG. 4 shows the refractive index profile of such a FMF, which describes the relationship between the refractive index value n and the distance r from the center of the optical fiber. The x-axis represents radial position with x=0 representing the center of the core region, and the y-axis represents refractive index, expressed as an index difference Dn unless otherwise stated.

In the embodiment of FIG. 4, the optical fiber has an optical core having a refractive index profile n(r) defined as follows:

$$n(r) = n_0 \cdot \sqrt{1 - 2\Delta\left(\frac{r}{r_1}\right)^{\alpha}} \text{ for } r \leq r_1$$

where:
r is a variable representative of the radius of the optical fiber,
$r_1$ is the optical core radius,
$\Delta$ is the normalized refractive index difference, with $$\Delta = \frac{n_0^2 - n_1^2}{2n_0^2}$$

$n_1$ is the minimal refractive index of the optical core,
$n_0$ is the maximal refractive index of the optical core,
$\alpha$ is a non-dimensional parameter that defines the index profile shape of the optical core.

The optical core is directly surrounded by an optical cladding, which comprises a depressed-index ring, also called a trench, with inner radius $r_2$ and outer radius $r_3$, and an outer cladding layer with inner radius $r_3$. In some embodiments such an outer cladding layer comprises pure silica glass ($SiO_2$) and its refractive index $n_{Cl}$ is hence that of silica glass. This trench has a negative refractive index difference $dn_3 = n_{trench} - n_{Cl}$ with respect to the refractive index of the outer cladding.

The cladding also includes an inner cladding layer, with inner radius $r_1$ and outer radius $r_2$. The trench is hence spaced apart from the core by the inner cladding layer. The inner cladding layer has a constant refractive index $n_2$, such that $n_2 = n_{Cl}$.

In an exemplary embodiment of the invention, such a FMF presents the following features:

$$R_1 = 14 \text{ }\mu m \pm 0.5 \text{ }\mu m$$

$$\Delta_1 = \frac{(n_0^2 - n_{Cl}^2)}{2n_0^2} = 0.705\% \pm 0.04\%$$

$$R_2 = 15.3 \text{ }\mu m \pm 0.5 \text{ }\mu m$$

$$R_3 = 21.4 \text{ }\mu m \pm 0.5 \text{ }\mu m$$

$$\Delta n_3 = n_{trench} - n_{Cl} = -5 \times 10^{-3} \pm 0.5 \times 10^{-3}$$

Like previously described in relation to FIGS. 2 and 3, by solving the scalar wave equation through numerical simulation, one can approximate $\Delta\tau$ as follows, for such a FMF fiber:

$$\Delta\tau(\lambda,\alpha) = p00 + p10*\lambda + p01*\alpha + p11*\lambda*\alpha + p02*\alpha^2$$

with:
p00=−1.776 (−1.947, −1.604)
p10=−0.00186 (−0.001977, −0.001743)
p01=1.517 (1.389, 1.644)
p11=0.000982 (0.0009262, 0.001038)
p02=−0.3505 (−0.3776, −0.3235)

and where the values between brackets ( ) correspond to the 95% confidence bounds.

Such an approximation may be graphically displayed as shown on FIG. 5, where the X-axis corresponds to the wavelength $\lambda$ expressed in nanometers, the Y-axis corresponds to the $\alpha$-value of the FMF fiber, and the Z-axis corresponds to the time delays difference between consecutive mode groups $\Delta\tau$ in ps/m. Each black dot on FIG. 5 corresponds to a value calculated from the above model equation for $\Delta\tau$ ($\lambda$, $\alpha$), while the gray-shaded surface corresponds to the surface which may be approximated on the basis of the computed dots.

Making the assumption that the length of MGS optical fiber used is L=550 m, with a FWQM of the reference pulse $\Delta T_{REF}$=40 ps, one may derive the abacus displayed on FIG. 6, where the X-axis corresponds to the wavelength $\lambda$ expressed in nanometers, and where the Y-axis corresponds to the $\alpha$-value of the FMF fiber. The different curves drawn on the abacus of FIG. 6 correspond to the first part $$\frac{|\Delta\tau| \cdot L}{\Delta T_{REF}}$$

of the criterion described above. The number set on each curve indicates the value of $$\frac{|\Delta\tau| \cdot L}{\Delta T_{REF}},$$

ranging from 4 to 10.

As may be observed on FIG. 6, the blank zone corresponding to $\alpha$ values roughly comprised between 1.8 and 2.2 is a forbidden zone, in which the criterion set above cannot be satisfied by the multimode optical fiber. Such a criterion may either by satisfied by choosing $\alpha$ values below 1.8 or above around 2.45 at a wavelength $\lambda$=850 nm or above around 2.25 at a wavelength $\lambda$=1500 nm.

FIGS. 7 to 13 describe several features of an embodiment of the method and system according to the invention using a specific Mode Group Separating optical fiber as described above in relation to FIGS. 1 to 6.

In the embodiment described hereafter, the Mode Group Separating (MGS) optical fiber is a multimode fiber with an $\alpha$-profile graded index core with an $\alpha$-value much lower than conventional multimode fibers, which generally show an $\alpha$-value close to 2. Actually, the $\alpha$-value of the MGS optical fiber is close to 1.6. Moreover, such a fiber has a core diameter of 50 $\mu m \pm 2.5$ $\mu m$ and a numerical aperture NA=0.200±0.015. As shown on the abacus of FIG. 3, such a MGS fiber thus satisfies the criterion $$\frac{|\Delta\tau| \cdot L}{\Delta T_{REF}} > 4$$

for any wavelength between 850 nm and 1500 nm.

FIG. 7 shows the DMD profile of this MGS optical fiber, of length L=550 m.

A Ti:Sapphire laser of wavelength $\lambda$=850 nm is used as a light source for obtaining the DMD profile of the MGS optical fiber. The laser pulse is launched to the input side of the MGS fiber by means of a 5 $\mu m$ 'launch fiber' (i.e. the launch spot size has a 5 $\mu m$ diameter). The launch fiber's position is changed in steps of 1 or 2 µm, starting at the center of the MGS optical fiber core, and ending at the outer radius of the MGS optical fiber core. Such a DMD measurement complies with the specifications in IEC 60793-2-10 and is hence fully standardized.

A digital signal analyzer detects the pulses leaving the MGS optical fiber. The plotted pulses are normalized: the 'outer pulse', launched at 25 µm from the core center has maximum noise because the pulse travels at the edge of the core, and is partly launched in the non-guiding cladding of the MGS fiber. As a consequence, less pulse power reaches the detector.

The plot on FIG. 7 clearly shows that the different Mode Groups output by the MGS optical fiber are located at different time locations: the Mode Groups are hence temporally separated by the MGS fiber. The left side of the plot is set to 0.0 ns.

As may be observed, from the first to the 13th Mode Group, all Mode Groups show a constant distance in time position. From the 14th Mode Group (encircled on FIG. 7), the pattern start being irregular to some level, which may be caused by cladding effects and/or contributions from leaky modes.

However, FIG. 7 clearly shows that, thanks to the specific MGS optical fiber described above, the mode groups can be separated in time at DMD measurements, which allows characterizing the behavior of these Mode Groups while traveling through an optical component, as will be described in greater details in relation to FIGS. 8 to 13.

These figures focus on an embodiment of the invention, in which the Mode Group selective attenuation of a Variable Optical Attenuator is investigated.

Variable Optical Attenuators, also known as VOA, are commonly used for purpose of Bit Error Rate (BER) measurement of an optical fiber. However, it is known that VOAs show a Mode Group selective attenuation. Such a Mode Group selective attenuation of the VOA must be known and taken into account to measure BER of an optical fiber. If not, the conclusions drawn on the fiber quality may be altered and mixed with the VOA characteristics.

FIG. 13 shows an embodiment of the system used for characterizing the behavior of Mode Groups traveling through an optical component, such as a VOA.

Such a system comprises a laser 1, which is a Ti:Sapphire laser at a wavelength λ=850 nm. A coupler 2 achieves the coupling of the laser bundle output by laser 1 to a launch fiber 3. The launch fiber 3 has a 5 µm diameter spot and is associated to a scan unit 4, in order to achieve the launching of pulses into the Mode Group Separating optical fiber 5. The launch position is offset by 1 µm or 2 µm steps, starting from the core center to the core outer radius of the MGS fiber 5.

An optical component 8 under test is disposed on the optical path between the output of the MGS fiber 5 and a detector 10. Two couplers 6 and 7 allow coupling of light into and out of the optical component 8. As will be described in greater detail below, in an exemplary embodiment of the invention such an optical component is a VOA.

However, it must be noted that, if there is no optical component in box 8, the system of FIG. 13 may allow characterizing the behavior of the Mode Groups traveling through detector 10, and which are input through detector pigtail 9.

FIG. 8 shows the DMD profile measured thanks to the system of FIG. 13, with a VOA inserted in box 8. The light pulses are launched into MGS optical fiber 5, and travel through the VOA 8, before being detected by detector 10.

The resulting DMD profile can be compared with the DMD profile of the MGS optical fiber 5 shown on FIG. 7. The same time scale is used on both FIGS. 7 and 8. Moreover, on the Y-axis, the plots show the normalized pulses at launch position, expressed in µm. Hence, the difference in power per Mode Group cannot directly be seen on the DMD profile plots. It may be noted however, that there is an increase of noise for the outer pulses in the DMD profile measured at the output of the VOA, as compared to the DMD profile of FIG. 7 measured for the MGS optical fiber alone.

FIG. 9 offers another way of plotting the results of the DMD measurements with or without the VOA 8: the power of the pulses (pulse trains) is plotted for both DMD measurements as a function of the launch position expressed in µm.

Curve 91 shows the pulse power as a function of the launch position for the MGS optical fiber 5. Curve 92 shows the pulse power as a function of the pulse launch position for the DMD light pulses, which have travelled through both the MGS optical fiber 5 and the VOA 8. The shaded area, which appears between curves 91 and 92, is a measure for the Mode Group selective attenuation of the VOA.

According to an embodiment of the invention, the DMD measurement carried out with use of the MGS optical fiber also allows generating the ratio of powers per individual Mode Group, thanks to the fact that the Mode Groups in the DMD profile are temporally apart from each other.

FIG. 10 shows the 'Mode Power Distributions' (MPD) of the light entering the VOA 8. In other words, the power of the light pulses is shown on the Z-axis, as a function of the offset launch expressed in µm on the X-axis and of the mode group number on the Y-axis. Such a "Mode Power Distribution" is measured at the output of the MGS optical fiber 5, when there is no VOA on the optical path in FIG. 13. Such a three-dimensional representation is obtained by using the information on the DMD profile of FIG. 7, though "un-normalized" and computing the power within each of the of the individual mode groups at each launch position of FIG. 9.

In the same way, FIG. 11 shows the 'Mode Power Distributions' (MPD) of the light leaving the VOA.

The loss (expressed in dB) per Mode Group Number inside the VOA can be computed from the 'Mode Power Distributions' (MPD) of the light entering and leaving the VOA respectively shown on FIGS. 10 and 11, and is illustrated by FIG. 12. The difference in pulse powers between FIGS. 10 and 11, added for the different offset launch positions for each Mode Group, allows computing the loss induced for each Mode Group by the VOA 8.

As may be observed, the loss per Mode Group on average is 6 dB, but higher order Mode Groups are attenuated more. This could be a typical consequence of non-ideal alignment of the optical components, since Mode Groups that travel near the edge of the core are lost more easily.

In an alternative embodiment of the invention, a second Mode Group Separating MMF may be added to the experimental setup of FIG. 13, at the output of the optical component under test 8.

Such a second MGS could help analyze the modes coupling phenomenon, which takes place within the optical component. New modes, induced by mode coupling, could thus be observed.

In yet another embodiment of the invention, the experimental setup of FIG. 13 could be altered by exchanging positions of the optical component 8 and of the MGS fiber 5. The launching fiber 3 and scan unit 4 need only allow for one given launching condition into the optical component 8. The MGS optical fiber 5 hence serves as a tool to separate the Mode Power Distribution induced by the light source 1 into the optical component 8 from a given launching condition.

It must be noted that, for all the embodiments described above, critical parameters are the accuracy of the refractive index profile of the MGS special fiber, the choice of length of this fiber and the positional accuracies of the launch fiber scan unit and the couplers in the system of FIG. 13. The detector characteristics are also crucial when testing an optical component other than the detector itself.

Although the embodiment described above focuses on testing a VOA used within BER equipment, many other embodiments may be considered, such as for example embodiments allowing the qualification of various optical detectors used with SML DMD qualification, which is a most important measurement to qualify OM4 fibers.

New types of optical fibers may also be qualified using the method according to embodiments of the invention, such as 'Few Mode fibers' and fibers that suffer from Microbend.

The invention claimed is:

1. A method for characterizing mode group properties of multimodal light traveling through an optical component, wherein said method comprises the steps of:
    providing a Mode Group Separating optical fiber (5) in an optical path between a light source (1) and said optical component (8);
    launching reference pulses of light with a wavelength $\lambda_t$ from said light source (1) through said Mode Group Separating optical fiber (5) into said optical component (8) at radial offsets between a core center and a core radius of said Mode Group Separating optical fiber;
    detecting a light signal output by said optical component (8);
    wherein said Mode Group Separating optical fiber is a multimode fiber with an $\alpha$-profile graded index core with an $\alpha$-value chosen such that said Mode Group Separating optical fiber satisfies the following criterion at the wavelength $\lambda_t$:

$$\frac{|\Delta\tau| \cdot L}{\Delta T_{REF}} > 4$$

where:
    $\Delta\tau$ is a time delay difference between consecutive mode groups expressed in ps/m;
    L is a length of said Mode Group Separating optical fiber expressed in m;
    $\Delta T_{REF}$ is a Full Width at Quarter Maximum of said reference pulses expressed in ps, where the Full Width at Quarter Maximum of a reference pulse is the difference between the two time values at which the power of the reference pulse is equal to quarter of its maximum value.

2. The method according to claim 1, comprising:
    measuring a Dispersion Modal delay profile for said Mode Group Separating optical fiber, called a reference DMD profile;
    measuring a Dispersion Modal delay profile at the output of said optical component, called a resulting DMD profile;
    comparing said reference DMD profile and said resulting DMD profile in order to characterize the mode group properties of multimodal light traveling through said optical component.

3. The method according to claim 1, wherein said Mode Group Separating optical fiber satisfies the following criterion at the wavelength $\lambda_t$:

$$\frac{|\Delta\tau| \cdot L}{\Delta T_{REF}} > 5.$$

4. The method according to claim 1, wherein said wavelength $\lambda_t$ is between 800 nm and 1500 nm.

5. The method according to claim 1, wherein said Mode Group Separating optical fiber has a core diameter of 50 µm ±2.5 µm and a numerical aperture NA=0.2 ±0.015, and wherein:

$$\Delta\tau(\lambda,\alpha) = p00 + p10*\lambda + p01*\alpha + p11*\lambda*\alpha + p02*\alpha^2$$

with:
p00 between −1.461 and −1.116
p10 between −0.001516 and −0.00128
p01 between 1.061 and 1.317
p11 between 0.0006583 and 0.0007706, and
p02 between −0.3125 and −0.2581.

6. The method according to claim 5, wherein:
p00 = −1.288
p10 = −0.001398
p01 = 1.189
p11 = 0.0007145
p02 = −0.2853.

7. The method according to claim 1, wherein said Mode Group Separating optical fiber is a Few Mode optical fiber comprising an optical core having a radius $R_1$ and a maximal refractive index $n_0$ and an optical cladding surrounding the optical core,
    said optical cladding having at its outer edge a refractive index $n_{Cl}$,
    wherein said optical cladding comprises an inner cladding layer directly surrounding said optical core, with an inner radius $R_1$ and an outer radius $R_2 \geq R_1$, said inner cladding layer having a constant refractive index $n_2 = n_{Cl}$, and a region of depressed refractive index $n_{trench}$, called a trench, surrounding said inner cladding layer, said trench having an inner radius $R_2$, with $R_2 \geq R_1$, and an outer radius $R_3$, with $R_3 > R_2$.

8. The method according to claim 7, wherein:

$R_1 = 14 \ \mu m \pm 0.5 \ \mu m$ $\Delta_1 = \frac{(n_0^2 - n_{Cl}^2)}{2n_0^2} = 0.705\% \pm 0.04\%$ $R_2 = 15.3 \ \mu m \pm 0.5 \ \mu m$ $R_3 = 21.4 \ \mu m \pm 0.5 \ \mu m$ $\Delta n_3 = n_{trench} - n_{Cl} = -5 \times 10^{-3} \pm 0.5 \times 10^{-3}$ and wherein :

$$\Delta\tau(\lambda,\alpha) = p00 + p10*\lambda + p01*\alpha + p11*\lambda*\alpha + p02*\alpha^2$$

with :
p00 between −1.947 and −1.604
p10 between −0.001977 and −0.001743
p01 between 1.389 and 1.644 p11 between 0.0009262 and 0.001038, and
p02 between −0.3776 and −0.3235.

9. The method according to claim 8, wherein:
p00=−1.776
p10=−0.00186
p01=1.517
p11=0.000982
p02=−0.3505.

10. The method according to claim 1, wherein L=550 m and $\Delta T_{REF}$=40 ps.

11. The method according to claim 1, wherein said optical component comprises:
a Variable Optical Attenuator (VOA);
an optical fiber;
a coupler; or
a detector.

12. The method according to claim 1, comprising:
collecting light output by said optical component into a second Mode Group Separating optical fiber;
and wherein said second Mode Group Separating optical fiber is a multimode fiber with an α-profile graded index core with an α-value chosen such that said Mode Group Separating optical fiber satisfies the following criterion at the wavelength $\lambda_t$:

$$\frac{|\Delta\tau| \cdot L}{\Delta T_{REF}} > 4$$

where:
$\Delta\tau$ is a time delay difference between consecutive mode groups expressed in ps/m;
L is a length of said Mode Group Separating optical fiber expressed in m;
$\Delta T_{REF}$ is a Full Width Quarter Maximum of said reference pulses expressed in ps.

* * * * *